(12) United States Patent
Manik et al.

(10) Patent No.: US 9,730,051 B2
(45) Date of Patent: Aug. 8, 2017

(54) RESIDENTIAL GATEWAY HAVING WIRELESS AND WIRELINE INTERFACES

(71) Applicant: BCE INC., Verdun (CA)

(72) Inventors: Jessie Manik, Brampton (CA); Roswell A. Ruby, Ottawa (CA); Erone Quek, North York (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 15/206,864

(22) Filed: Jul. 11, 2016

(65) Prior Publication Data

US 2017/0013441 A1    Jan. 12, 2017

Related U.S. Application Data

(60) Provisional application No. 62/190,500, filed on Jul. 9, 2015.

(51) Int. Cl.
| | | |
|---|---|---|
| *H04L 12/66* | (2006.01) | |
| *H04W 8/18* | (2009.01) | |
| *H04W 28/12* | (2009.01) | |
| *H04W 92/02* | (2009.01) | |
| *H04W 88/06* | (2009.01) | |
| *H04W 88/16* | (2009.01) | |

(52) U.S. Cl.
CPC ............ *H04W 8/183* (2013.01); *H04L 12/66* (2013.01); *H04W 88/06* (2013.01); *H04W 88/16* (2013.01); *H04W 92/02* (2013.01)

(58) Field of Classification Search
CPC ..... H04W 8/183; H04W 52/54; H04W 76/02; H04L 9/32; H04L 12/46; H04L 12/66
See application file for complete search history.

(56) References Cited

U.S. PATENT DOCUMENTS

| | | | | |
|---|---|---|---|---|
| 7,596,129 | B2* | 9/2009 | Bossemeyer, Jr. | H04L 12/6418 370/352 |
| 8,036,664 | B2* | 10/2011 | Khetawat | H04W 24/02 370/216 |
| 2009/0198996 | A1* | 8/2009 | Lie | H04L 63/08 713/155 |
| 2011/0216646 | A1* | 9/2011 | Flinta | H04L 12/5692 370/220 |
| 2012/0069737 | A1* | 3/2012 | Vikberg | H04W 28/12 370/232 |
| 2013/0089013 | A1* | 4/2013 | Carnero Ros | H04W 28/12 370/310 |
| 2014/0128052 | A1* | 5/2014 | Aguirre | H04W 84/14 455/418 |
| 2015/0044983 | A1* | 2/2015 | Nasir | H04W 4/22 455/404.2 |
| 2016/0192277 | A1* | 6/2016 | Starsinic | H04L 63/105 370/329 |

* cited by examiner

*Primary Examiner* — Blane Jackson
(74) *Attorney, Agent, or Firm* — Gowling WLG (Canada) LLP

(57) ABSTRACT

A hybrid residential gateway may provide network access using either a wireless access interface or a wired access interface. Network access over either interface may be authenticated using a single SIM card within the residential gateway.

14 Claims, 6 Drawing Sheets

RESIDENTIAL GATEWAY HAVING WIRELESS AND WIRELINE INTERFACES

RELATED APPLICATIONS

The current application claims priority to U.S. Provisional Patent Application 62/190,500 filed Jul. 9, 2015, the entire contents of which are hereby incorporated by reference.

TECHNICAL FIELD

The current disclosure relates to network access, and in particular to a unified network architecture providing network access, authorization and configuration across multiple access technologies.

BACKGROUND

Access to a packet data network (PDN), such as the Internet, can be accomplished using various different access technologies. For example, fixed or wireline access may be provided using copper based networks and/or optical-based networks, while wireless access may be provided using a cellular or radio access network. Generally, the cellular network provides packet access to mobile devices such as smart phones or tablets and fixed or wireline access provides packet data access in home or office environments.

Cellular networks typically use a SIM (Subscriber Identity Module) card to in order to authenticate and authorize user, or more particularly user equipment, access to the wireless services the user has subscribed to. In contrast, fixed or wireline access often requires authentication and authorization using credentials such as a user name and a password, or similar approach. Wireline access is often provided through a local residential gateway (RG) or modem that must be configured appropriately, including for example provisioning of the username and password, to provide the packet data network access. If there are any mis-configurations in the residential gateway (RG) or modem, network access may not be possible and further online diagnosis by technical support personnel may be difficult or even impossible.

BRIEF DESCRIPTION OF THE DRAWINGS

Embodiments are described herein with references to the appended drawings, in which.

DETAILED DESCRIPTION

Figure 1:
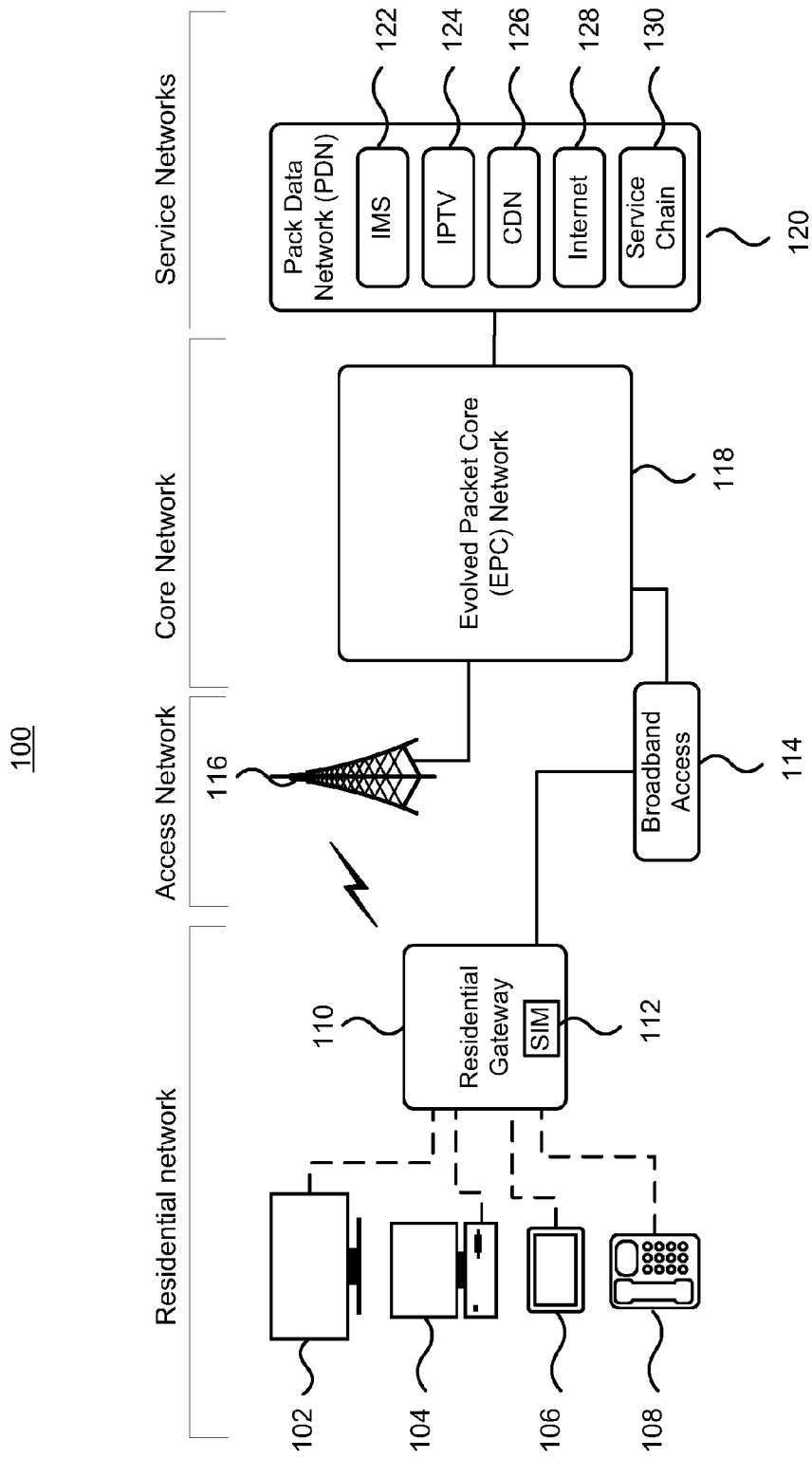
FIG. 1 depicts a system providing a unified service architecture for accessing a packet data network

In accordance with the present disclosure there is provided a system providing access to a packet data network (PDN) comprising: a residential gateway device providing access to the PDN comprising: a subscriber identity module (SIM) interface for receiving a SIM card comprising a unique identifier associated with a subscriber; a wireline access interface for connecting to the PDN through a wireline access infrastructure; a wireless access interface for connecting to the PDN wirelessly through a wireless access infrastructure; and a local area network (LAN) interface providing PDN access to computing devices; and an evolved packet core (EPC) network for authorizing the subscriber's access to the PDN over both the wireline access interface and the wireless access interface.

In a further embodiment of the system, the residential gateway accesses the EPC network using the wireless access interface in order to configure access through the wireline access interface.

In a further embodiment of the system, the residential gateway provides access to the PDN from the LAN using the wireless access interface if access to the PDN through the wireline access interface is interrupted.

In a further embodiment of the system, the residential gateway further comprises an EPC client for accessing the EPC through the wireline access interface and the wireless access interface.

In a further embodiment of the system, the residential gateway does not require a user name or password for authorizing the subscriber's access through the wireline access interface.

In a further embodiment, the system further comprises: a wireless access infrastructure comprising a plurality of eNodeBs coupling the wireless access interface of the residential gateway to the EPC network; and a broadband access infrastructure coupling the wireline access interface of the residential gateway to the EPC network.

In a further embodiment of the system, the EPC network comprises separate wireless EPC network components and wireline EPC network components.

In accordance with the present disclosure there is further provided a residential gateway device providing access to a packet delivery network (PDN) comprising: a subscriber identity module (SIM) interface for receiving a SIM card comprising a unique identifier associated with a subscriber; a wireline access interface for connecting to the PDN through a wireline access infrastructure; a wireless access interface for connecting to the PDN wirelessly through a wireless access infrastructure; a local area network (LAN) interface providing PDN access to computing devices, wherein the wireless access interface and the wireline access interface connect to an evolved packet core (EPC) network capable authorizing the subscriber's access to the PDN over both the wireline access interface and the wireless access interface.

In a further embodiment of the residential gateway, the residential gateway accesses the EPC network using the wireless access interface in order to configure access through the wireline access interface.

In a further embodiment of the residential gateway, the residential gateway provides access to the PDN from the LAN using the wireless access interface if access to the PDN through the wireline access interface is interrupted.

In a further embodiment of the residential gateway, the residential gateway further comprises an EPC client for accessing the EPC through the wireline access interface and the wireless access interface.

In a further embodiment of the residential gateway, the residential gateway does not require a user name or password for authorizing the subscriber's access through the wireline access interface.

In accordance with the present disclosure there is further provided a method of accessing a packet data network (PDN) comprising: provisioning access information to wireless and wireline authentication services located in an Evolved Packet Core (EPC) network; receiving a subscriber identifier from a residential gateway and authenticating and activating subscriber access to the PDN using a wireless interface; and providing PDN access to the residential gateway over a wired interface of the residential gateway.

In a further embodiment, the method further comprises: providing PDN access to the residential gateway over the wireless interface prior to providing the PDN access over the wired interface.

In a further embodiment, the method further comprises: remotely configuring the wireline interface of the residential gateway over the wireless interface of the residential gateway.

In a further embodiment, the method further comprises: providing PDN access to the residential gateway over the wireless interface if the wireline interface fails.

In a further embodiment of the method, the subscriber identifier is provided from a subscriber identity module (SIM) card of the residential gateway.

Fixed broadband or wireline access customers may be directly engaged to undertake actions in the provisioning process to configure their residential gateways (RGs) for network access. Customers may have to call a help desk or service technician in order to understand the necessary steps or to correct possible customer mis-configurations. Further, currently, the customer has to retain information on their service settings in order to re-configure the residential gateway in case the gateway needs to be reset or replaced. The customers must also remember user ids/passwords, follow instructions for browser access to their residential gateway and navigate configuration changes. There is very low expectation that customers will remember their user-ID and passwords. Mis-steps require a help desk call which risks increasing a customer's negative experience. The need for customers to undertake the reconfiguration may be a result of service provider network changes or accidentally caused by the customer when the user self-troubleshoots issues. Mis-configuration of the residential gateway can result in a poor service experience or even customer revenue loss from unbilled usage (due to the customer's network connection being down).

As described further below, new functionality may be introduced into the residential gateway (RG), and supported by cooperating functionality in the service provider's networking infrastructure, that removes the customer from active engagement in the provisioning process, and as such can reduce the problems associated with potential mis-configurations. The new functionality provides the customer a virtually plug-in experience to access a fixed broadband network through a residential gateway. The access residential credentials and configuration may be managed within the network of a service provider. As a result of managing configuration information within the network, there is no requirement for the customer to be part of the access configuration process through entering of user IDs and passwords, etc. A residential gateway is described further below that incorporates both a wireless, or cellular, interface as well as a wireline interface for connecting to a service provider network. In addition to providing two access interfaces, the residential gateway and the supporting network infrastructure of the service provider allows the user access to one or more services using the same user identification platform or information, which may be provided for example as a Subscriber Identity Module (SIM) card that is inserted or integrated into the residential gateway. That is, network access over both the wireless and wireline access infrastructure may be authenticated using a single or common SIM card in the residential gateway. Further, the residential gateway's wireless connection to the service provider network may provide an initial network connection that may be used to subsequently configure the fixed or wireline connection of the residential gateway. Further, the wireless connection may provide redundancy or a fail-over for the wireline connection, or, in some cases, may be used to provide additional or supplemental bandwidth allocation to the customer.

Residential customers may subscribe to one or more services provided over a network. For example, a customer may subscribe to Internet services, home phone services as well as television services, which all may be provided over a network connection. The network connection may be provided using wireline access network technologies for example using DSL, Cable, or optical network technologies (or any combination thereof). Regardless of the particular wireline access technology-used, a residential gateway (RG) is typically located in the customer's premise to connect to the wireline access network infrastructure in order to access particular services. The residential gateway also provides a local network interface to allow various devices in the customer's premise to connect to the network. Specifically, the residential gateway may provide one or more wired or wireless local area network interfaces or connections to allow in-home devices, such as televisions, set top boxes, computers and phones to connect to the residential gateway. The residential gateway may require configuration of various network parameters such as setting MTU size, VLAN identifiers, access type and other possible settings in order to properly connect to the subscribed- to services. Devices may be authenticated and authorized for accessing one or more available services, for example using a user name and optionally a password, or as described further herein using a SIM card or similar identity management platform or technique. If parameters including username and password settings are not properly configured in the residential gateway, access to the subscribed to services may not be possible. Further, if network access is not possible, it may be difficult or impossible for a technician to remotely diagnose and/or correct any issues with the residential gateway. As described further herein, the residential gateway may be provided with or adapted to include a SIM card for use in authenticating and authorizing a subscriber using a unified service architecture that is adapted to allow network access over both a wireless infrastructure and wireline infrastructure using the same SIM card. Further, the residential gateway may be provided with a cellular radio for accessing network functionality wirelessly. As described further below, the wireless network and wireline network may share functionality for accessing packet data networks (PDNs).

FIG. 1 depicts an example of a system providing a unified service architecture for accessing a packet data network. The system 100 comprises a number of interacting components. The components are broadly grouped together into a residential network portion, an access network portion, a core network portion and service networks that provide services such as IPTV, IMS, Internet etc. The grouping of the various components as shown in FIG. 1 is merely intended to simplify and clarify the description and is not mean to be limiting. Those skilled in the art will appreciate that it is possible for components to be located in different portions of the system. For example, certain functionality may be located within the residential gateway depicted as being within the residential network, or the same functionality may in various other embodiments be located within a portion of the access network, core network and/or the service network. The residential network may include a number of customer devices such as a television and/or set top box 102, a computer 104, portable device 106, home phone 108 connected to a residential gateway 110 that provides access to the subscribed-to services. Furthermore, the residential gateway may provide a combined modem, router and access point functionality for the local area network(s) of the residential network.

The residential gateway 110 may comprise both a wireless access interface such as a cellular interface that may provide access to services through wireless technologies such as Long Term Evolution (LTE). The residential gateway 110 may also comprise a fixed broadband (BB) or wireline interface for providing wired access through a broadband connection, which may be provided by various technologies including for example digital subscriber line (DSL), cable, fiber optics as well as combinations of said individual technologies. Whether connecting using the wireless interface or the wired broadband interface, the residential gateway 110 may use a SIM card 112 (or the credentials stored on a SIM card) for the authentication and authorization of the residential gateway to access subscribed-to network services over either or both of the wireless and wireline interfaces. Accordingly, the user may not need to actively configure the residential gateway, or even enter credentials such as a username and password, beyond inserting a SIM card. Instead, the residential gateway's SIM card may simply be used to efficiently enable activation of (and authentication to) subscribed-to services with the network service provider. Further, if additional configuration of the fixed or wireline interface of the residential gateway is required, for example in order to set or reset network parameters such as MTU size, VLANs etc., remote access to the residential gateway may be provided via the wireless interface allowing a service provider technician to remotely configure (or reconfigure) the wireline interface of the residential gateway as appropriate over the wireless interface.

The residential gateway 110 may access a core network portion through fixed or wired broadband access 114 or through a wireless infrastructure 116. The wireless access infrastructure 116 may include for example a plurality of radio towers, which in the case of LTE may be eNodeBs. Both the wired and wireless connections may access a unified architecture provided by an Evolved Packet Core (EPC) network 118. The EPC network is well known to those skilled in the art and may typically comprise functionality for allowing access to PDNs via LTE (or IP) connections. Advantageously, and as will be described below, the EPC network 118 may also be used to provide AAA services (i.e. authentication, authorization and accounting) to the wired broadband connection of the residential gateway. The EPC 118 may be connected to one or more packet data networks (PDNs) 120 that provide various services such as IP Multimedia Subsystem (IMS) 122 services, IPTV 124 services, CDN 126 services, Internet services 128 and service chain services 130.

In order to access the PDNs using the unified service architecture of the present invention, the residential gateway may include the SIM card 112 in order to authenticate and authorize network access. Further, the residential gateway 110 may include EPC client functionality that mimics, emulates or otherwise provides at least a portion of the access functionality typically provided by an eNodeB (in an LTE network, for example) in order to allow the wireline interface of the residential gateway to utilize the EPC functionality typically used for wireless access in 4G LTE networks. Further, although not depicted in FIG. 1, the broadband access infrastructure 114 may include access management functionality that provides the fixed edge access to the EPC. Thus, the EPC client and the access management functionality allow the wireline interface of the residential gateway to utilize an EPC infrastructure (or scheme) for network access.

Using the SIM card-enabled residential gateway 110 and the unified service architecture of the present invention, a subscriber to both wired and wireless packet data network services may be provided with a simplified and common customer experience when activating/configuring services and devices. Furthermore, a subscriber of fixed or wireline broadband services may be provided with a seamless and quick activation (or plug and play) experience. For example, provisioning of previous fixed broadband (wireline) services may, in some cases, require a technician to setup and install the wireline access. A new customer may therefore have to wait possibly a number of days before the network services become available. In contrast, the residential gateway and unified service architecture described herein may allow a user or customer to utilize the wireless interface for immediate network access to their services before the technician is available to complete wireline access/installation and as such may be provided with network access sooner.

Further, if the residential gateway 110 incorporates a wireless radio interface, such as an LTE radio, it is possible to provide fail-over network access to the residential gateway in case the fixed or wired broadband access fails, either as a result of a problem in the broadband access network or due to mis-configuration of the wireline interface of the residential gateway. In cases of mis-configuration, the fail-over access provided by the LTE access may be used by a technician to remotely diagnose and/or correct mis-configuration issues with the residential gateway. Additionally, as mentioned above, the wireless access may be used to provide immediate network access to the subscriber if any physical installation is required for completing set-up of the wireline access.

Figure 2:
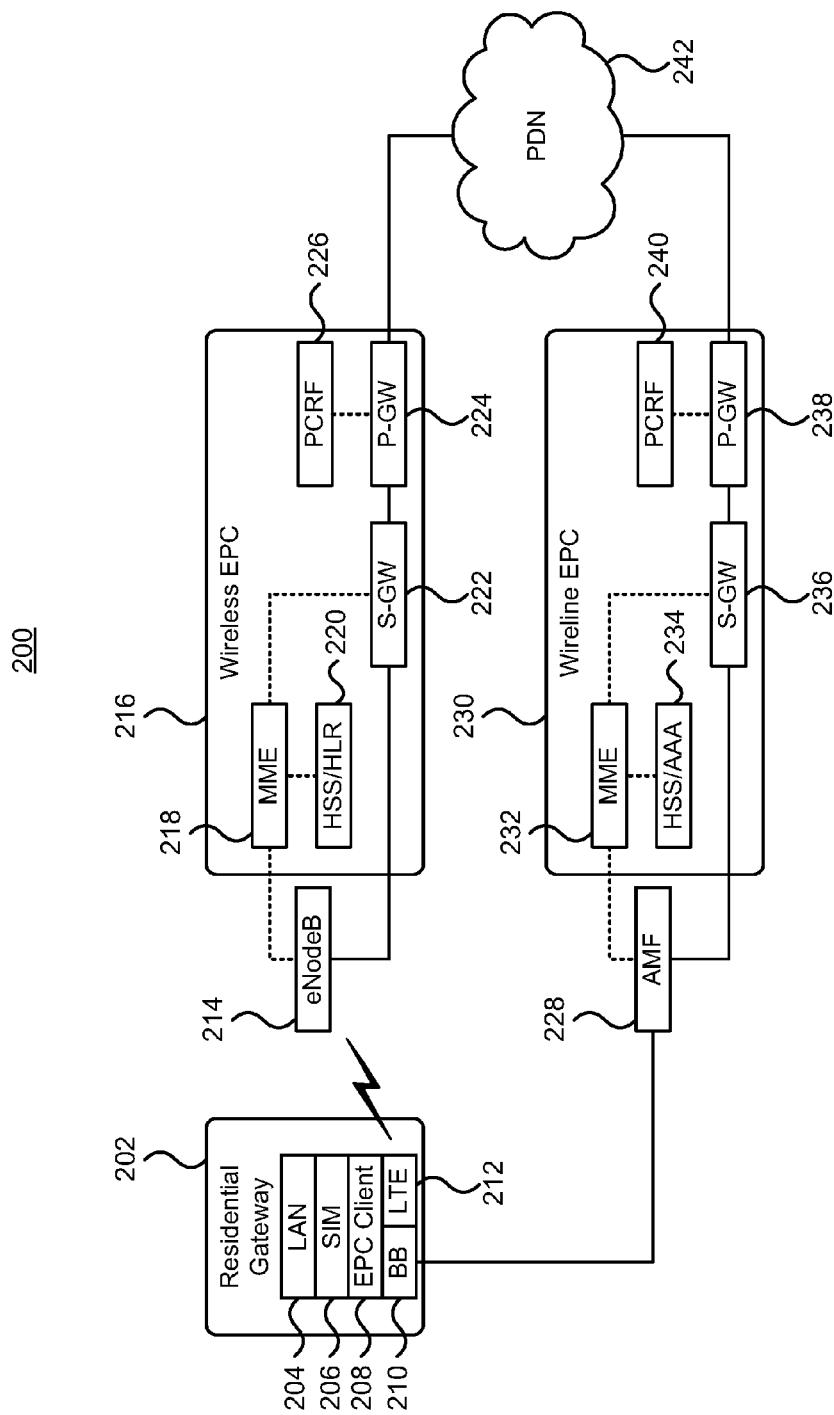
FIG. 2 depicts details of a system providing a unified service architecture for accessing a packet data network.

FIG. 2 depicts details of a system providing a unified service architecture for accessing a packet data network according to one embodiment of the invention. The system 200 comprises a residential gateway 202 for connecting to one or more services provided by a packet delivery network (PDN) 242. The residential gateway is depicted as comprising a local area network (LAN) interface 204. The LAN interface 204 allows one or more computer devices to connect to the residential gateway 202. The LAN interface 204 may be provided by a wired interface such as an Ethernet interface or other wired interfaces and/or by a wireless interface such as a Wi-Fi interface. The residential gateway 202 may further comprise a SIM interface 206 for receiving a SIM card. The SIM card has a unique identifier that is associated with the subscriber. The residential gateway 202 may further comprise EPC client functionality 208. The EPC client functionality 208 may provide various functionality for establishing connections through the EPC, including for example access point name (APN) service identification, mobility management entity (MME) stream control transmission protocol (SCTP) transport, packet delivery network (PDN)/bearer/SDF path as well as serving gateway (S-GW) GPRS tunneling protocol (GTP). The EPC client functionality may be used to originate and terminate S1 interfaces such as S1-MME and S1-U interfaces. The EPC client functionality 208 may take SIM credentials from an inserted SIM card and authenticate the access over either one of the wireline interface 210 or the wireless interface 212, which may be for example a long term evolution (LTE) interface, of the residential gateway.

The residential gateway 202 may use its wireless interface 212 to connect to a radio access network which is depicted as being provided by an enhanced nodeB (eNodeB) that connects the wireless interface 212 to functionality of a wireless portion of an evolved packet core (EPC) 216. The wireless EPC functionality 216 includes a mobility management entity (MME) 218, a home subscriber server (HSS)/home location register (HLR) 220. The MME 218 manages connections to the user device and authenticating the user in cooperating with the HSS/HLR 220. The HSS/HLR 220 may be provided as a subscriber information database. A serving gateway (S-GW) 222 and packet data network gateway (P-GW) 224 provide a connection to the PDN 242. The P-GW 224 may cooperate with policy and charging rules function functionality (PCRF) 226 for applying policies and charging functionality to user traffic.

The EPC further includes wireline EPC functionality 230 for connecting the wireline (BB) interface 210 of the residential gateway to the PDN. As depicted, the wireline EPC functionality 230 is similar to the wireless functionality; however, rather than connecting to an eNodeB within the access network portion, the wireline EPC functionality 230 communicates with the residential gateway through access management function (AMF) functionality 228. The AMF functionality 228 provides fixed edge access to the EPC for the wireline (BB) interface 210 of the residential gateway. The AMF functionality 228 provides an interface between the EPC and wireline interface that mimics the functionality of the eNodeB 214. The wireline EPC 230 comprises an MME 232 and S-GW 236 that provide the same functionality for wireline access as the MME 218 and S-GW 222 provides for wireless access. The wireline EPC includes a HSS/AAA functionality 234 for providing authentication, authorization and accounting functionality typically associated with the wireline access. The wireline EPC functionality further comprises P-GW functionality 238 and PCRF functionality 240 for connecting to the PDN 242 and applying policies to the user traffic.

It will be appreciated by those skilled in the art that the implementation depicted above with reference to FIG. 2 is but one possible implementation for providing a unified service architecture for an EPC that is capable of authorizing a subscriber's access to one or more services provided by a PDN over both wireline interfaces and wireless interfaces. In particular, the implementation depicted in FIG. 2 depicts separate wireless EPC infrastructure and wireline EPC infrastructure.

Figure 3:
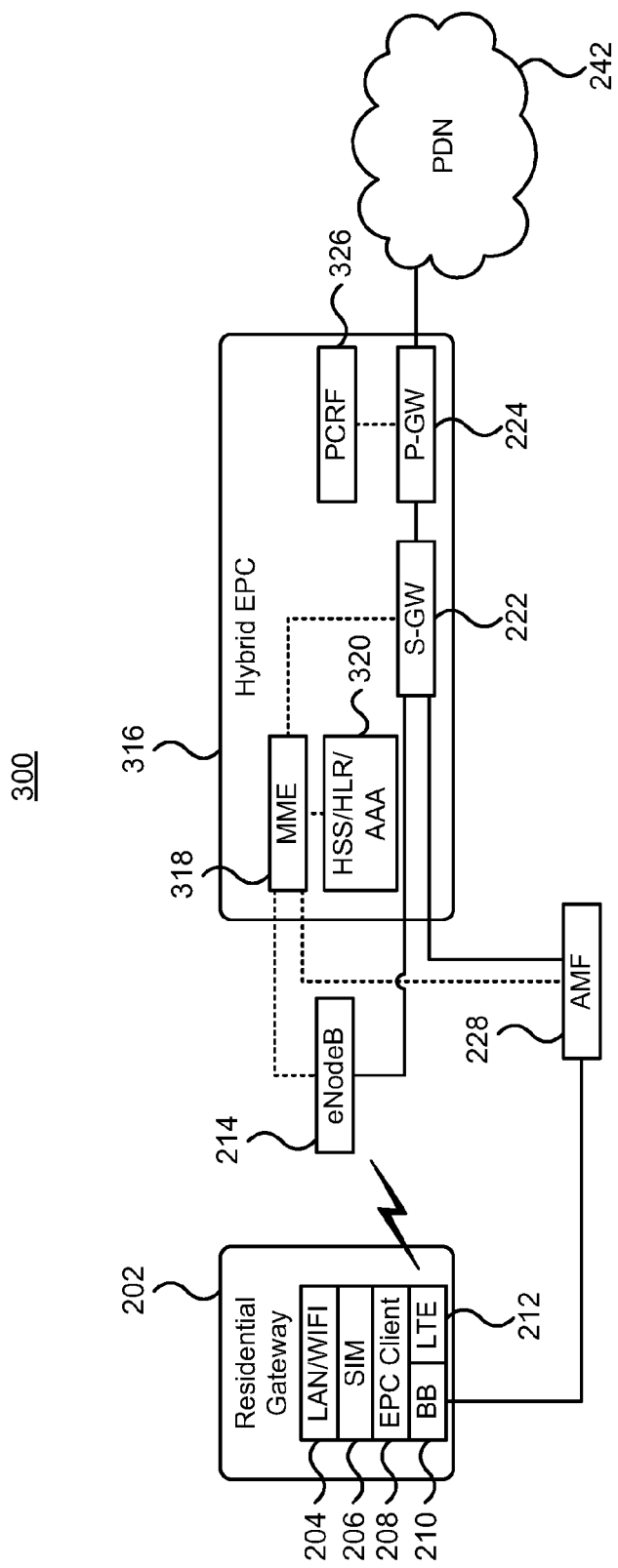
FIG. 3 depicts details of a further system providing a unified service architecture for accessing a packet data network.

FIG. 3 depicts details of a further system providing a unified service architecture for accessing a packet data network. The system 300 is similar to that described above with reference to FIG. 2 and as such only differences are described further. In contrast to the system 200, which includes separate EPC infrastructure or functionality for the wireless and wireline interfaces, the system 300 provides a single hybrid EPC 316 capable of connecting both wireless (e.g. LTE) interfaces 212 and wireline (BB) interfaces 210 to a PDN 242. As depicted, the hybrid EPC 316 comprises an MME 318 capable of communicating with either eNodeB (s) 214 or AMF functionality 228 depending upon the type of interface being used. The separate HSS/HLR 220 and HSS/AAA 234 functionality is combined together as a single HSSS/HLR/AAA component 320 that cooperates with the MME to authenticate the residential gateway, whether through the eNodeB 214 or through the AMF 228. The hybrid EPC 316 comprises an S-GW 222 and P-GW 224 similar to those described above; however, the P-GW 224 cooperates with a combined PRF functionality 326 that provides policies for both wired and wireless access.

Figure 4:
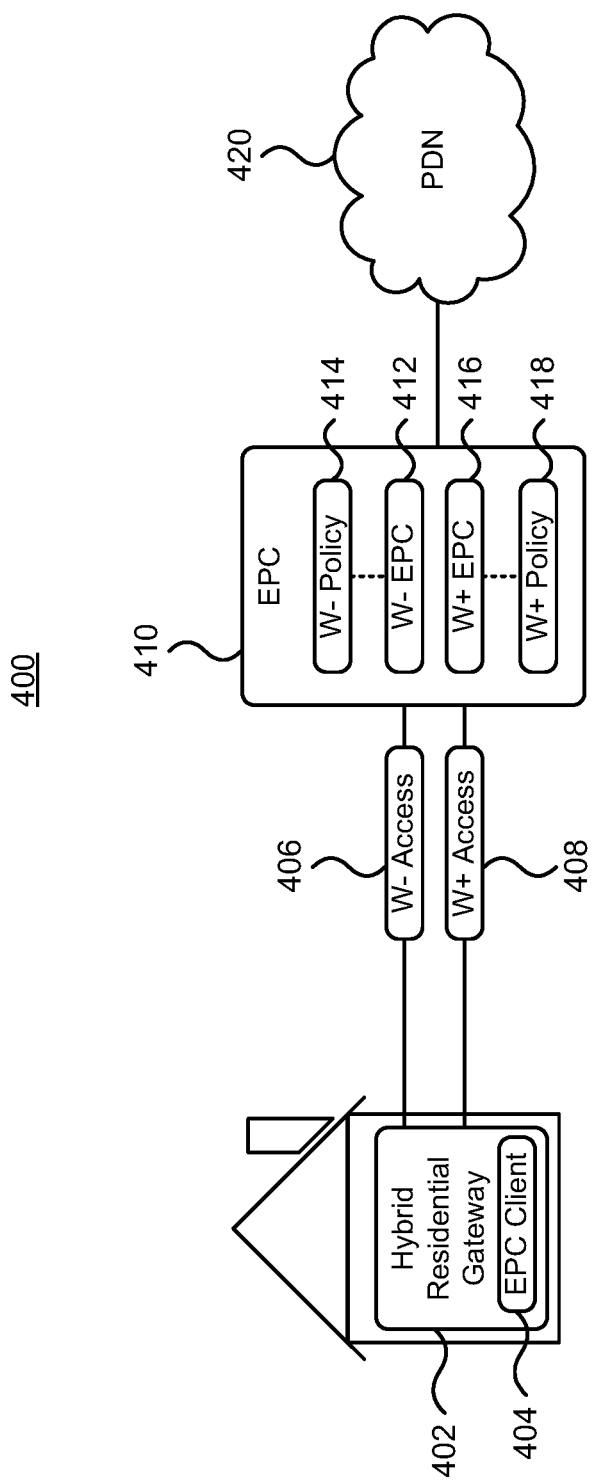
FIG. 4 depicts details of a further system providing a unified service architecture for accessing a packet data network.

FIG. 4 depicts details of a further system providing a unified service architecture for accessing a packet data network. The system 400 is similar to the systems described above. A hybrid residential gateway 402 provides both wired and wireless access to a PDN 420. The hybrid gateway includes an EPC client 404 that provides functionality for authenticating a subscriber over either one of the wired (fixed) access network or the wireless access network using a common SIM card (as depicted in FIG. 1). As depicted, the hybrid residential gateway 402 is connected to an EPC network 410 by a wireless (W−) access network 406 and by a wireline (W+) access network 408. The EPC network 410 comprises wireless EPC infrastructure or components 412 including wireless policy functionality 414 as well as wired EPC infrastructure or components 416 including wired policy functionality 418. The EPC 410 connects the hybrid residential gateway 402 to the PDN using either one, or both, of the wireless and wired access networks 406, 408.

Figure 5:
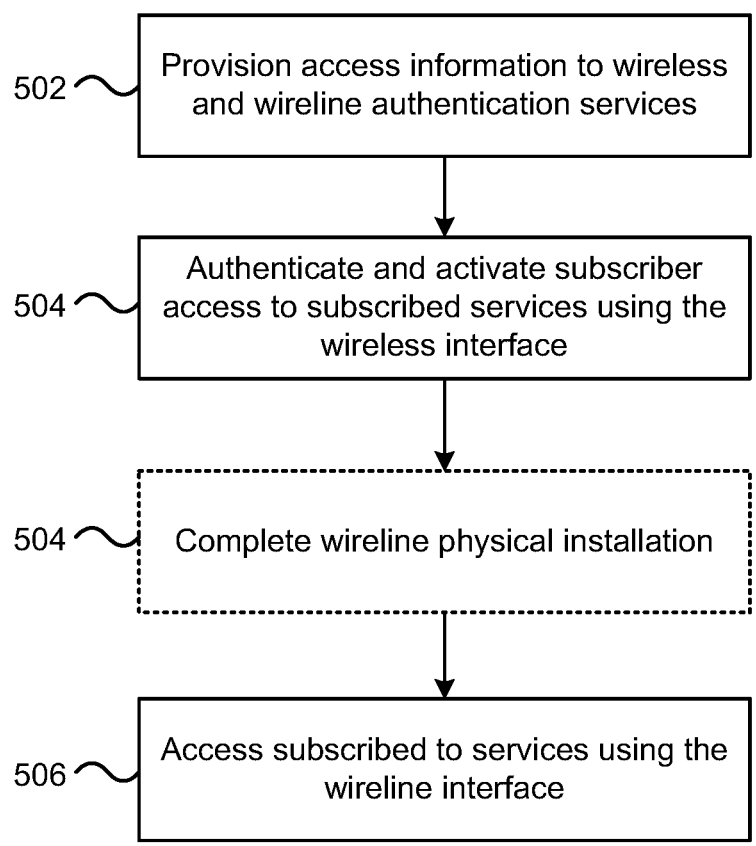
FIG. 5 depicts a method of activating a residential gateway in a unified service architecture system.

FIG. 5 depicts a method of activating a residential gateway in a unified service architecture system according to another aspect of the invention. The method 500 begins with provisioning access information to wireless and wireline authentication services (502). The provisioning may provide information such as unique SIM card identifier (such as an IMSI) to authentication and authorization services in the EPC network that allow the authentication/authorization of the user to access services over both the wireless and wireline interfaces. The provisioning may be effected by the service provider when a user orders one or more services. Once the customer information is provisioned to the authentication services, the subscriber or customer may authenticate and activate his/her access to the subscribed-to services using the wireless interface of the residential gateway (504). As described earlier, the authentication and authorization may be done using the SIM card and associated authentication/authorization functionality in the EPC network. With the subscriber authenticated and activated, the subscribed-to services may be immediately accessed over the wireless interface of the residential gateway. FIG. 5 assumes that the wireline network is not immediately available, for example some physical setup by a service technician such as cable installation is required. Accordingly, at some point in time a technician or user completes the physical installation of the wireline network (506). Once set-up of the wireline network is complete, the residential gateway may transparently switch over to using the wireline interface for accessing the subscribed-to services (508). It will be appreciated that prior to completing the wireline network set-up or installation, the residential gateway may continue to access the network services over the wireless infrastructure. Although the above example is described as first activating the subscriber using the wireless interface, it is possible that the wired interface, if the fixed or wireline broadband network is installed, may be used to activate the user since the EPC is adapted to provide a unified service architecture for both broadband and LTE access.

Figure 6:
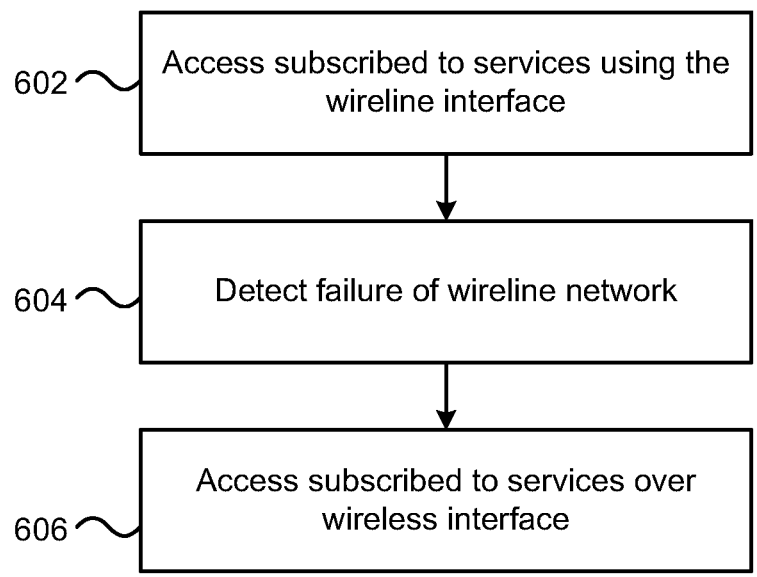
FIG. 6 depicts a method of failover service in a residential gateway.

FIG. 6 depicts a method of providing failover service in a residential gateway. A residential gateway provides access to subscribed-to services using the wireline interface (602). At some point, the wireline access fails and the failure is detected (604). Once the failure is detected, the residential gateway may fail-over to using the wireless access interface in order to access the subscribed to services (606). Since both the wireless and wireline interfaces access the PDN services through a unified service architecture that provides an EPC that can authenticate and authorize access for both wireless and wireline interfaces using the same SIM credentials, the fail-over may be seamless and transparent to the user.

As described above, a residential gateway may be integrated with a SIM card. By incorporating in the residential gateway the use of a SIM and 3GPP (EPC) protocol for the fixed access the customer may be provided with a plug-in-play experience that does not require the customer to configure the gateway. With the integration of the SIM in the residential gateway there is no dependence on the customer to provide or remember user identification information such as user names or account identifiers and passwords. The integration of the SIM provides the residential gateway with a customer and service identification model that is not used by fixed access providers but one that mobility service providers benefit from today. The residential gateway setup and service access is not dependent on the customer. Access credentials may be managed by the network and the residential gateway device. Identification of the customer and residential gateway configuration for service (3GPP/EPC) connectivity is part of the connection process.

In addition to the SIM, the residential gateway may further include EPC client functionality. The integration of the EPC client enables the residential gateway to not only access the network but to configure network connectivity using a model that Mobility service providers benefit from today. The residential gateway can be informed by the network of the connection configuration required to connect to the services they have purchased. The EPC client permits the residential gateway to connect the customer to their services through 3GPP (EPC protocols) over the Fixed network interface. This provides access to a services infrastructure that today is available to mobile provides over LTE (Radio). The EPC client in the residential gateway enables the device to negotiate service access on the fixed access network by using 3GPP over a non-radio transport. The EPC may use 3GPP protocols to communicate directly with the MME/S-GW and other EPC elements to establish connectivity to a PDN service. The EPC in conjunction with the SIM information in the residential gateway can now configure connectivity to services using mobile concepts to connect to services using the mobile model using APNs and SIM identifiers to establish connects to the MME/S-GW/ for service connectivity on a Fixed or Mobile access. The residential gateway broadband interface uses the same user identifier in the SIM to establish a connection to the Fix access and Mobile access using L2/L3 for its transport.

The broadband access component may include Access Management Functions that includes Access Authorization and the residential gateway management function FDM (Fixed Device Management). These functions may be accessible over a default control path that is established by the residential gateway broadband interface. The residential gateway may have new functionality to provide a default control path. For the residential gateway broadband (Fixed) interface the SIM credentials are also used to authorize access to the broadband (Fixed) access. The credentials are used by Access Management Function (AMF) to authorize access to the Broadband network. The AMF provides access restrictions as appropriate. The use of the SIM credentials in the AMF may reduce fraudulent use of ids and unbilled usage. The functions supporting authorization build on existing or available authorization elements e.g. Radius, DHCP. The use of the residential gateway SIM based credentials permits identification of the user in a common model between the Mobile access and fixed access. The SIM incorporation enables the enhancement of the authorization exchange to reduce fixed access fraud.

The Fixed Device Management permits fixed access management and device configuration. Existing CMS/ACS functions may use this control path. The FDM and residential gateway does not rely on the "service/data" Internet access that is used for modem management in previous residential gateways and/or modems.

The above has described various functionality provided by various systems. The functionality may be provided as a combination of hardware, firmware and software comprising instructions stored in a memory that are executed by a processor. The executed instructions configure devices to provide at least some of the functionality described. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A system providing access to a packet data network (PDN) comprising:
    a residential gateway device providing access to the PDN comprising:
        a subscriber identity module (SIM) interface for receiving a SIM card comprising a unique identifier associated with a subscriber;
        a wireline access interface for connecting to the PDN through a wireline access infrastructure;
        a wireless access interface for connecting to the PDN wirelessly through a wireless access infrastructure; and
        a local area network (LAN) interface providing PDN access to computing devices; and
    an evolved packet core (EPC) network for authorizing the subscriber's access to the PDN over both the wireline access interface and the wireless access interface,
    wherein the residential gateway accesses the EPC network using the wireless access interface in order to configure access through the wireline access interface.

2. The system of claim 1, wherein the residential gateway provides access to the PDN from the LAN using the wireless access interface if access to the PDN through the wireline access interface is interrupted.

3. The system of claim 1, wherein the residential gateway further comprises an EPC client for accessing the EPC through the wireline access interface and the wireless access interface.

4. The system of claim 1, wherein the residential gateway does not require a user name or password for authorizing the subscriber's access through the wireline access interface.

5. The system of claim 1, further comprising:
    a wireless access infrastructure comprising a plurality of eNodeBs coupling the wireless access interface of the residential gateway to the EPC network; and
    a broadband access infrastructure coupling the wireline access interface of the residential gateway to the EPC network.

6. The system of claim 1, wherein the EPC network comprises separate wireless EPC network components and wireline EPC network components.

7. A residential gateway device providing access to a packet delivery network (PDN) comprising:
- a subscriber identity module (SIM) interface for receiving a SIM card comprising a unique identifier associated with a subscriber;
- a wireline access interface for connecting to the PDN through a wireline access infrastructure;
- a wireless access interface for connecting to the PDN wirelessly through a wireless access infrastructure;
- a local area network (LAN) interface providing PDN access to computing devices,
- wherein the wireless access interface and the wireline access interface connect to an evolved packet core (EPC) network capable authorizing the subscriber's access to the PDN over both the wireline access interface and the wireless access interface,
- wherein the residential gateway accesses the EPC network using the wireless access interface in order to configure access through the wireline access interface.

8. The residential gateway device of claim 7, wherein the residential gateway provides access to the PDN from the LAN using the wireless access interface if access to the PDN through the wireline access interface is interrupted.

9. The residential gateway device of claim 7, wherein the residential gateway further comprises an EPC client for accessing the EPC through the wireline access interface and the wireless access interface.

10. The residential gateway device of claim 7, wherein the residential gateway does not require a user name or password for authorizing the subscriber's access through the wireline access interface.

11. A method of accessing a packet data network (PDN) comprising:
- provisioning access information to wireless and wireline authentication services located in an Evolved Packet Core (EPC) network;
- receiving a subscriber identifier from a residential gateway and authenticating and activating subscriber access to the PDN using a wireless interface; and
- providing PDN access to the residential gateway over the wireless interface;
- providing PDN access to the residential gateway over a wired interface of the residential gateway, after providing PDN access to the residential gateway over the wireless interface.

12. The method of claim 11, further comprising remotely configuring the wireline interface of the residential gateway over the wireless interface of the residential gateway.

13. The method of claim 11, further comprising providing PDN access to the residential gateway over the wireless interface if the wireline interface fails.

14. The method of claim 11, wherein the subscriber identifier is provided from a subscriber identity module (SIM) card of the residential gateway.

* * * * *